United States Patent [19]
Klatt

[11] 3,866,981
[45] Feb. 18, 1975

[54] ANTISKID VEHICLE BRAKE SYSTEM FOR INDIVIDUAL WHEEL CONTROL

[75] Inventor: Alfred Klatt, Ronnenberg, Germany

[73] Assignee: WABCO Westinghouse GmbH, Hannover, Germany

[22] Filed: Mar. 27, 1974

[21] Appl. No.: 455,246

[30] Foreign Application Priority Data
June 29, 1973 Germany............................ 2333125

[52] U.S. Cl............. 303/21 A, 188/181 A, 303/20, 303/21 P
[51] Int. Cl............................................... B06t 8/12
[58] Field of Search ..................... 303/21, 20, 15, 3; 188/181

[56] References Cited
UNITED STATES PATENTS

| | | | |
|---|---|---|---|
| 3,231,315 | 1/1966 | Turnbull........................... | 303/21 F |
| 3,494,671 | 2/1970 | Slavin et al....................... | 303/21 P |
| 3,549,212 | 12/1970 | Leiber............................... | 303/21 F |
| 3,671,082 | 6/1972 | Stevens............................. | 303/21 A |
| 3,674,318 | 7/1972 | Hickner et al.................... | 303/21 A |
| 3,771,840 | 11/1973 | Hubbard........................... | 303/21 EB |
| 3,797,893 | 3/1974 | Burckhardt et al.............. | 303/21 BE |

Primary Examiner—George E. A. Halvosa
Assistant Examiner—D. C. Butler
Attorney, Agent, or Firm—R. W. McIntire, Jr.

[57] ABSTRACT

An electronic brake control circuit for effecting wheel skid control by modulating vehicle brake pressure on an individual wheel basis. Each wheel brake cylinder is provided with a pressure switch whose signal acts through novel logic control circuitry of the individual wheels. The logic control circuitry acts in parallel with conventional wheel evaluation control means for effecting operation of modulator valves such that the influence of one wheel brake control upon the other is forestalled until the one wheel brake pressure is sensed by its pressure switch as being below a preselected value. This value is selected in accordance with the maximum brake pressure attainable so that the resultant wheel brake pressure differential never exceeds a value considered unsafe from the standpoint of steering stability. In forestalling the influence of one wheel brake control upon the other when the modulator valves of the one wheel are actuated to correct an impending wheel skid, the other wheel is subjected to normal braking for a longer duration than heretofore obtained to also achieve reasonably good stopping distances in addition to stable steering characteristics.

5 Claims, 1 Drawing Figure

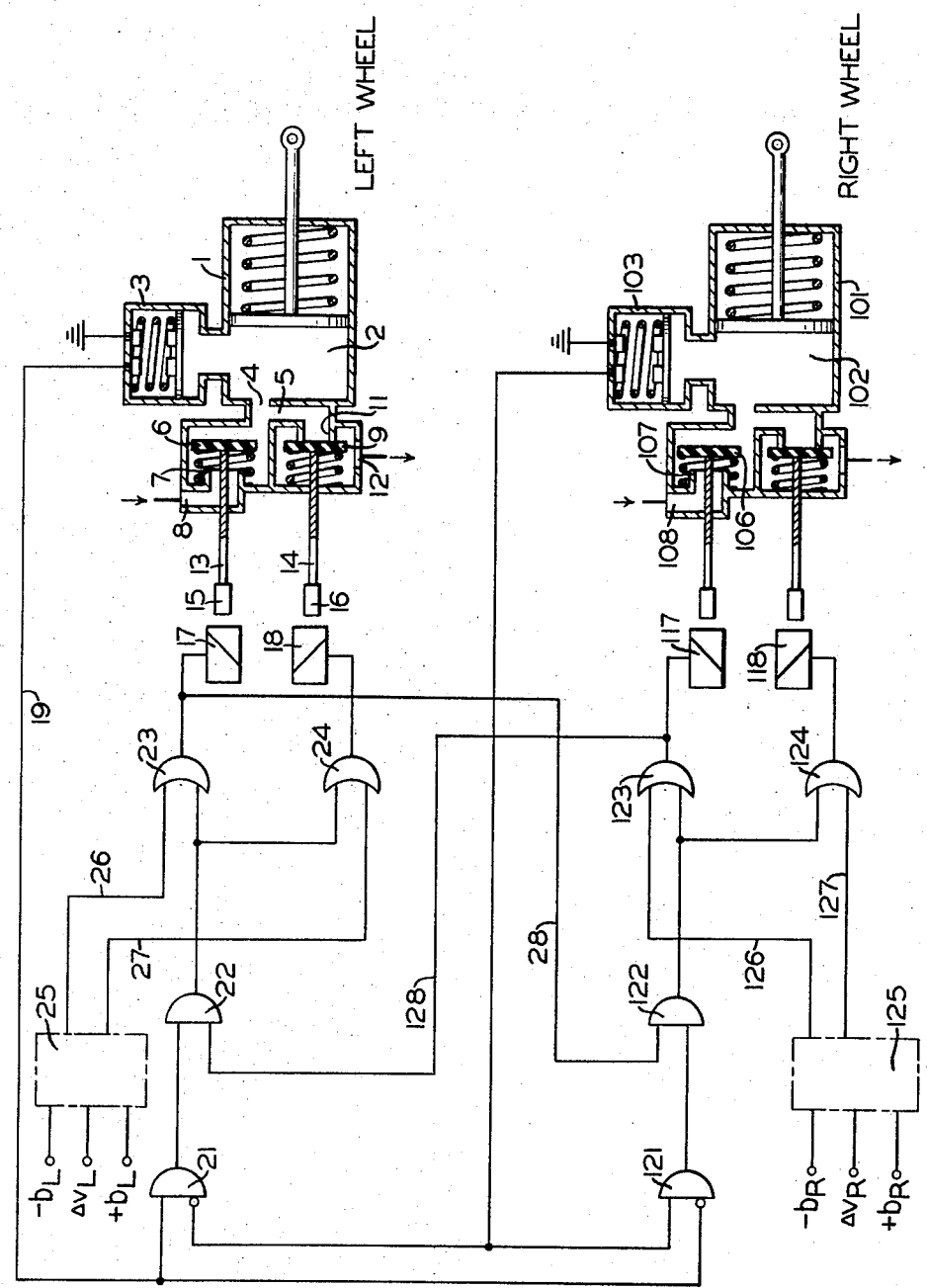

ANTISKID VEHICLE BRAKE SYSTEM FOR INDIVIDUAL WHEEL CONTROL

BACKGROUND OF THE INVENTION

The present invention is concerned with vehicle brake systems of the type arranged to provide individual wheel antiskid control. Such arrangements are well known to provide for adjustment of the normal wheel brake pressure according to the adhesion level at each particular wheel, in order to realize the maximum brake capacity possible at each wheel under existing road conditions. This individual wheel brake control has the advantage of providing the shortest stopping distance of the vehicle, but is also known to have the disadvantage of creating disproportionate brake forces at the respective wheels of a common axle, such as the steering wheels, for example. This is known to cause sudden vehicle swerving when a wheel on one side of the vehicle encounters a particularly poor or slippery road surface, while the wheel on the other side is experiencing normal road adhesion. On vehicles with short wheel bases, particularly, severe vehicle lashing and steering instability result, due to the panic reaction of the operator in attempting to counter steer the vehicle.

To avoid such yawing forces where the vehicle steering wheels are running on a road surface having different friction characteristics, arrangements have been devised which control adjustment of the normal braking pressure of the respective wheels according to the dynamic characteristics of the wheel running on the poorer road surface. Obviously, this prevents the wheel running on the better road surface from attaining its optimum brake pressure and accordingly increases the vehicle stopping distance, albeit the vehicle steering stability is improved. It will be appreciated, therefore, that in attempting to improve the vehicle safety from the standpoint of better steering stability, the vehicle stopping distance performance is compromised and the vehicle safety is in fact jeopardized.

SUMMARY OF THE INVENTION

It is therefore an object of the present invention to provide a wheel skid brake control system of the type discussed which is capable of providing improved vehicle stopping distances, while also preventing differences in the respective wheel brake pressures from arising sufficient to cause unsafe or difficult vehicle steering.

In accordance with this object, a pressure switch associated with the brake cylinder of each wheel of a common axle emits a signal to maintain a control circuit of the opposite wheel in a disabled condition when the pressure switch is actuated in response to a predetermined brake cylinder pressure being developed. The respective wheel control circuits effect operation of inlet and outlet modulator valves in parallel with the conventional wheel evaluation means so that when a signal arises from the evaluation means of one wheel to effect a reduction of brake pressure thereat, the brake pressure of the other wheel will remain unaffected until such time as the one wheel brake pressure drops below the predetermined level for which its pressure switch is adjusted. Opening of the pressure switch associated with the one wheel enables the control circuitry of the other wheel to, at that time, also effect a reduction of its brake pressure. Thus, the wheel subject to the higher adhesion level is able to provide maximum brake effort until such time as a preselected differential between the respective wheel brake pressures occurs. This differential is selected at a value below which vehicle yawing is considered inconsequential. Accordingly, the invention affords good utilization of available brake forces, while maintaining good directional stability of the vehicle.

Other objects and advantages of the invention will become apparent from the following more detailed description when taken in accordance with the accompanying single FIGURE drawing showing a circuit schematic according to the invention.

DESCRIPTION AND OPERATION

Associated with the left wheel of a vehicle axle is a brake cylinder device 1 having a fluid pressure operating chamber 2 to which a pressure actuated switch member 3 is connected. Also connected to chamber 2 via a passageway 4 is another pressure chamber 5, which is connected via an inlet modulator valve comprising valve element 6 and seat 7 to a supply port 8 and via an exhaust modulator valve comprising valve element 9 and seat 11 to an exhaust port 12. Supply port 8 may be connected to the outlet of a conventional, operator controlled, foot valve (not shown) for supplying operating chamber 2 with fluid pressure via the inlet modulator valve according to the degree of braking desired.

Valve elements 6 and 9 of the respective modulator valves are connected by rods 13 and 14 to the armatures 15 and 16 of electromagnetic actuators 17 and 18. A wire 19 extends from the positive pole of switch 3 to one input of an AND gate 21 in a control circuit associated with the left wheel of the vehicle. The output of AND gate 21 is connected to one input of another AND gate 22 whose output is in turn connected to a pair of OR gates 23 and 24. The output of OR gate 23 is connected to electromagnetic actuator 17 to effect closure of the inlet modulator valve when energized, it being understood that the inlet modulator valve is in its normally open condition when electromagnetic actuator 17 is deenergized. Similarly, the output of OR gate 24 is connected to electromagnetic actuator 18 to control the normally closed outlet modulator valve so as to effect opening thereof when energized.

Also associated with the left wheel to effect operation of the inlet and outlet modulator valves in parallel with the control circuit comprising AND gates 21 and 22 is wheel evaluation means 25 to which is connected wheel behavior signals $-b_L$, $\Delta V_L$ and $+b_L$ indicative of the dynamic characteristic of the left wheel of the vehicle. These wheel behavior signals are generated by conventional means (not shown). The $-b_L$ signal arises any time the rate of wheel deceleration exceeds a preselected threshold indicating an imminent wheel skid; the $\Delta V_L$ signal arises whenever the wheel velocity falls below a reference velocity by a predetermined percentage; and the $+b_L$ signal arises when the wheel is accelerating at a rate greater than a preselected rate, such as when a skidding wheel is reaccelerating to synchronous speed. Outputs of the evaluation means 25 are connected via lines 26 and 27 to the respective OR gates 23 and 24.

The right wheel of the vehicle axle on which the left wheel is also carried is similarly equipped with corresponding elements having reference numerals increased by 100. The anti-skid brake equipment of the respective left and right wheels is interconnected via AND gates 21, 121 and AND gates 22, 122. A negated input of AND gate 21 associated with the left wheel is connected to the positive pole of pressure switch 103 associated with the right wheel. Conversely, the negated input of AND gate 121 associated with the right wheel is connected to the positive pole of pressure switch 3 associated with the left wheel. Also, the output of OR gate 23 is connected by a line 28 to an input of AND gate 122, while the output of corresponding OR gate 123 of the right wheel is connected by a line 128 to an input of AND gate 22.

Under normal operating conditions, i.e., in the absence of any output signals from the evaluation means 25 and 125 of the respective wheels, the electromagnetic actuators 17, 18 and 117, 118 are deenergized so that the inlet and outlet modulator valves of each wheel assume their respective open and closed positions. This conditions pressure chambers 5 and 2 for development of brake pressure supplied to port 8 when a brake application is initiated.

Assuming such a brake application is in effect to such degree that the pressure switches 3 and 103 are actuated, an output signal from switch 3 will be registered at one input of AND gate 21 and at the negated input of AND gate 121, while an output signal from switch 103 is registered at the negated input of AND gate 21 and at the other input of AND gate 121. This results in each AND gate 21 and 121 being disabled. Thus, as long as the pressure in the brake cylinders 1 and 101 is sufficient to maintain closure of the respective pressure switches 3 and 103, electromagnetic actuators 17, 18 and 117, 118 are capable of being energized only in response to an output from wheel evaluation means 25 and 125, respectively, since energization by control circuit is prevented by disablement of AND gates 21 and 121. In that there is no interconnection between the outputs of evaluation means 25 with the circuitry of the right wheel or between evaluation means 125 and the circuitry of the left wheel; however, it should be clear that neither of the evaluation means is capable of influencing the brake pressure of the other wheel. From the following explanation, it will be seen that the control circuitry of the respective wheels is capable of influencing the other wheel brake pressure when either AND gate 21 or 121 is subsequently enabled.

For example, let it now be assumed that a $-b_L$ signal arises at evaluation means 25 indicative of the deceleration threshold being exceeded by the left wheel. Evaluation means 25 responds by providing output signals at lines 26 and 27, which act via OR gates 23 and 24 to effect energization of electromagnetic actuators 17 and 18. Accordingly, the inlet modulator valve is closed to interrupt the supply of brake pressure to chamber 5, while the outlet modulator valve is opened to exhaust the brake cylinder pressure in chamber 2 to atmosphere. As brake pressure is thus reduced at the left wheel brake cylinder device 1, it is to be understood that pressurization of the right wheel brake cylinder 101 continues under control of the operator controlled foot valve (not shown).

When the reduction of the left wheel brake cylinder pressure is sufficient to allow pressure switch 3 to open its contacts, the signal at the negated input of AND gate 121 disappears, thereby enabling the previously disabled AND gate 121 to supply an output signal to AND gate 122. The output of OR gate 23 is also supplied via line 28 to AND gate 122, which accordingly supplies an output signal via OR gates 123 and 124 to energize electromagnetic actuators 117 and 118. This results in the inlet and outlet modulator valves of the right wheel brake cylinder 101 being actuated from their normally open and closed position respectively under the influence of the control circuitry to exhaust brake pressure from chamber 102. The resultant reduction in braking pressure at the right wheel following reduction of brake pressure at the left wheel below the predetermined operating point of pressure switch 3 thus prevents an excessively large brake force difference between the two wheels due to the individual control exerted upon the left wheel when exceeding its deceleration threshold. The fact that the right wheel brake pressure is unmodulated until pressure switch 3 is opened, however, permits maximum development of the right wheel brake pressure to optimize braking during this period. Improvement is thus achieved in the vehicle stop distance, as compared to prior arrangements that limit the brake pressure differences during modulation of the brake pressure at one wheel.

When the right brake pressure drops below the operating point of pressure switch 103, the signal at the one input of AND gate 121 is removed to disable the control circuit of the right wheel and restore the inlet and outlet modulating valves to their normal positions. Concurrently, the control circuitry of the left wheel continues to be disabled due to the absence of a signal from pressure switch 3 at the one input of AND gate 21.

With the restoration of brake pressure to chamber 102 of the right wheel brake cylinder 101, pressure switch 103 is again actuated when the brake pressure reaches the switch actuating point, thereby again enabling the control circuitry to effect a reduction of the left wheel brake pressure. This results in a cycling tendency around the set point of the pressure switch to more or less maintain the right wheel brake pressure constant at the pressure switch operating point.

As normal rotation of the left wheel is reestablished, the output signals from wires 26 and 27 disappear in accordance with operation of evaluation means 25, thereby deenergizing electromagnetic actuators 17 and 18 via OR gates 23 and 24 to effect reapplication of brake pressure. The signal at the one input of AND gate 122 via wire 28 concurrently disappears to disable the right wheel control circuitry and thereby restore individual wheel brake control to the respective wheels independently of one another.

Having now described the invention, what I claim as new and desire to secure by letters Patent, is:

1. An antiskid control system for fluid pressure actuated brakes of a vehicle having a pair of independently rotatable wheels on a common axle of the vehicle, each wheel having monitoring means for generating a plurality of wheel behavior signals according to the dynamic conditions of that wheel and evaluation means controlled by said wheel behavior signals for effecting operation of modulator valve means disposed in the brake line connecting an operator controlled foot valve device to a brake cylinder of the wheel being monitored so as to adjust that wheel brake pressure, wherein the improvement comprises control circuit means for effecting operation of said modulator valve means in parallel with the evaluation means, said control circuit means including means for providing a brake pressure signal indicative of the wheel brake pressure being above or below a preselected value, said brake pressure signal of either one of the wheels being connected to said control circuit means of the other wheel to effect operation of the modulator valve means thereof when the brake pressure of the one wheel is below said preselected value and the brake pressure of the other wheel is above said preselected value.

2. The system as recited in claim 1, wherein each wheel control circuit means further comprises a first AND gate having one input to which is connected one wheel brake pressure signal and a negated input to which is connected the other wheel brake pressure signal, said AND gate being disabled to prevent said control circuit means from effecting operation of said modulator valve means whenever said brake pressure signals from each of the respective wheels are the same.

3. The system as recited in claim 2, wherein each wheel control circuit means further comprises second AND gate means having one input to which is connected the output of said first AND gate and a second input to which is connected a control signal indicative of the other wheel modulator valve means being operative to accordingly effect operation of the one wheel modulator valve means.

4. The system as recited in claim 3, wherein each wheel further comprises AND gate means subject to the output of the evaluation means and said second AND gate means for providing said parallel operation of the modulator valve means.

5. The system as recited in claim 1, wherein said means for providing said brake pressure signal is a brake pressure responsive switch.

* * * * *